US011683399B1

(12) United States Patent
Kiviranta et al.

(10) Patent No.: US 11,683,399 B1
(45) Date of Patent: Jun. 20, 2023

(54) METHOD FOR TIMELY TRANSMISSION OF DATA OVER LOSSY COMMUNICATION CHANNELS

(71) Applicant: Delta Cygni Labs Oy, Tampere (FI)

(72) Inventors: Sauli Kiviranta, Tampere (FI); Boris Krassi, Tampere (FI); Teemu Kumpumäki, Tampere (FI); Igor Levochkin, Tampere (FI); Marco Carandente, Tampere (FI)

(73) Assignee: Delta Cygni Labs Oy, Tampere (FI)

( * ) Notice: Subject to any disclaimer, the term of this patent is extended or adjusted under 35 U.S.C. 154(b) by 0 days.

(21) Appl. No.: 18/152,365

(22) Filed: Jan. 10, 2023

(51) Int. Cl.
*H04W 56/00* (2009.01)
*H04L 69/166* (2022.01)
*H04L 69/16* (2022.01)

(52) U.S. Cl.
CPC .......... *H04L 69/166* (2013.01); *H04L 69/161* (2013.01)

(58) Field of Classification Search
CPC .......................... H04L 69/166; H04L 69/161
See application file for complete search history.

(56) References Cited

U.S. PATENT DOCUMENTS

| 11,416,312 | B1 * | 8/2022 | Liu | G06F 16/182 |
| 2017/0220699 | A1 * | 8/2017 | Luo | G06F 16/90335 |
| 2022/0308957 | A1 * | 9/2022 | Soffer | H04L 9/0643 |

OTHER PUBLICATIONS

"Sun, CN-107330337, Mixing the cloud of data storing method, device, associated device and cloud system, 2017" (Year: 2017).*

* cited by examiner

*Primary Examiner* — Sai Ming Chan
(74) *Attorney, Agent, or Firm* — Ziegler IP Law Group

(57) ABSTRACT

A method for timely transmission of first payload of data from sender device to receiver device includes obtaining a first payload of data to be transmitted; slicing at sender device, first payload of data to at least to first fragment of data appended by first fragment metadata jointly forming first fragment of first fragment size, and to second fragment of data appended by second fragment metadata jointly forming second fragment of second fragment size; transmitting, at least first fragment over first communication channel and at least second fragment over second communication channel; receiving, at least first fragment and at least second fragment at receiver device; and reconstructing, at receiver device, first payload of data from at least first fragment using first fragment metadata and first fragment of data or from at least second fragment using the second fragment metadata and the second fragment of data.

19 Claims, 10 Drawing Sheets

METHOD FOR TIMELY TRANSMISSION OF DATA OVER LOSSY COMMUNICATION CHANNELS

TECHNICAL FIELD

The present disclosure relates to methods for timely transmission of data over lossy communication channels from a sender device to a receiver device.

BACKGROUND

Modern applications require a real-time bi-directional transmission of large amounts of data (such as video, voice, control, telemetry, and so forth) known as a payload of data. In particular, the payload of data is generated during an operation of the applications such as unmanned aerial vehicles (UAV), teleoperated and autonomous machines, interactive mixed reality (XR), cloud-based artificial intelligence (AI), factory and home automation and the Internet of Things (IoT).

Typically, User Datagram Protocol (UDP) protocols are used for sub-second transmission of payload of data, for example, WebRTC, SRT, QUIC. However, the UDP is restricted by security and deployment constraints (such as firewall and other organizational boundaries), exposure of inbound ports, network address table (NAT) traversal, network congestion and target flood, low goodput, limited VPN compatibility, and unreliable delivery.

Moreover, while using UDP in a lossy network (especially a last-mile radio network), a single detected error results in a data loss, that needs to be compensated with redundant data. The redundant data transmissions may further result in a reduced goodput.

Consequently, a Transmission Control Protocol (TCP) is utilized for transmission of payload of data, and examples of TCP such as, (LL-)HLS and RTMP are exempted from the aforementioned UDP limitations. In addition, the TCP is topologically server-mediated, and therefore the TCP-based protocols are inherently compatible with 5G/6G edge deployments, load balanced ingest, and proxied zero-trust architecture (ZTA). However, the existing TCP protocols suffer from latencies ranging from seconds to tens of seconds. Such latencies arise due to a head-of-line blocking (HOLB), or a degrading performance due to retransmission of missing data packets.

Moreover, while using TCP in a lossy network (especially a last-mile radio network), a single detected error results in a data retransmission, that holds the subsequent packets in a queue. The HOLB retransmissions may result in an unwanted delay.

Additionally, there exists a buffer bloat problem where due to large receive buffer sizes the data transmission may experience varying latencies and inefficient memory allocation.

These drawbacks lead to a significantly reduced performance in a low Round-trip time (RTT) telecommunication networks such as 5G/6G and a high-RTT telecommunication networks such as low Earth orbit (LEO) satellite networks.

Therefore, in light of the foregoing discussion, there exists a need to overcome the aforementioned drawbacks associated with existing methods for timely transmission of payload of data over lossy communication channels.

SUMMARY

The present disclosure seeks to provide a method for timely transmission of a first payload of data from a sender device to a receiver device. An aim of the present disclosure is to provide a solution that overcomes at least partially the problems encountered in prior art.

In one aspect, an embodiment of the present disclosure provides a method for timely transmission of a first payload of data from a sender device to a receiver device, the method comprising:
—obtaining, the first payload of data to be transmitted from the sender device to the receiver device;
—slicing, at the sender device, the first payload of data to at least to a first fragment of data appended by a first fragment metadata jointly forming a first fragment of a first fragment size, and to a second fragment of data appended by a second fragment metadata jointly forming a second fragment of a second fragment size;
—transmitting, the at least first fragment over a first communication channel and the at least second fragment over a second communication channel from the sender device to the receiver device;
—receiving, the at least first fragment over the first communication channel and the at least second fragment over the second communication channel at the receiver device from the sender device; and
—reconstructing, at the receiver device, the first payload of data from the at least first fragment using the first fragment metadata and the first fragment of data or from the at least second fragment using the second fragment metadata and the second fragment of data.

Embodiments of the present disclosure substantially eliminate or at least partially address the aforementioned problems in the prior art, and enable a low latency, high speed, reliable and secure transmission of the first payload of data from the sender device to the receiver device, where the transmission of the first payload of data is conducted timely over lossy communication channels.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure 1:
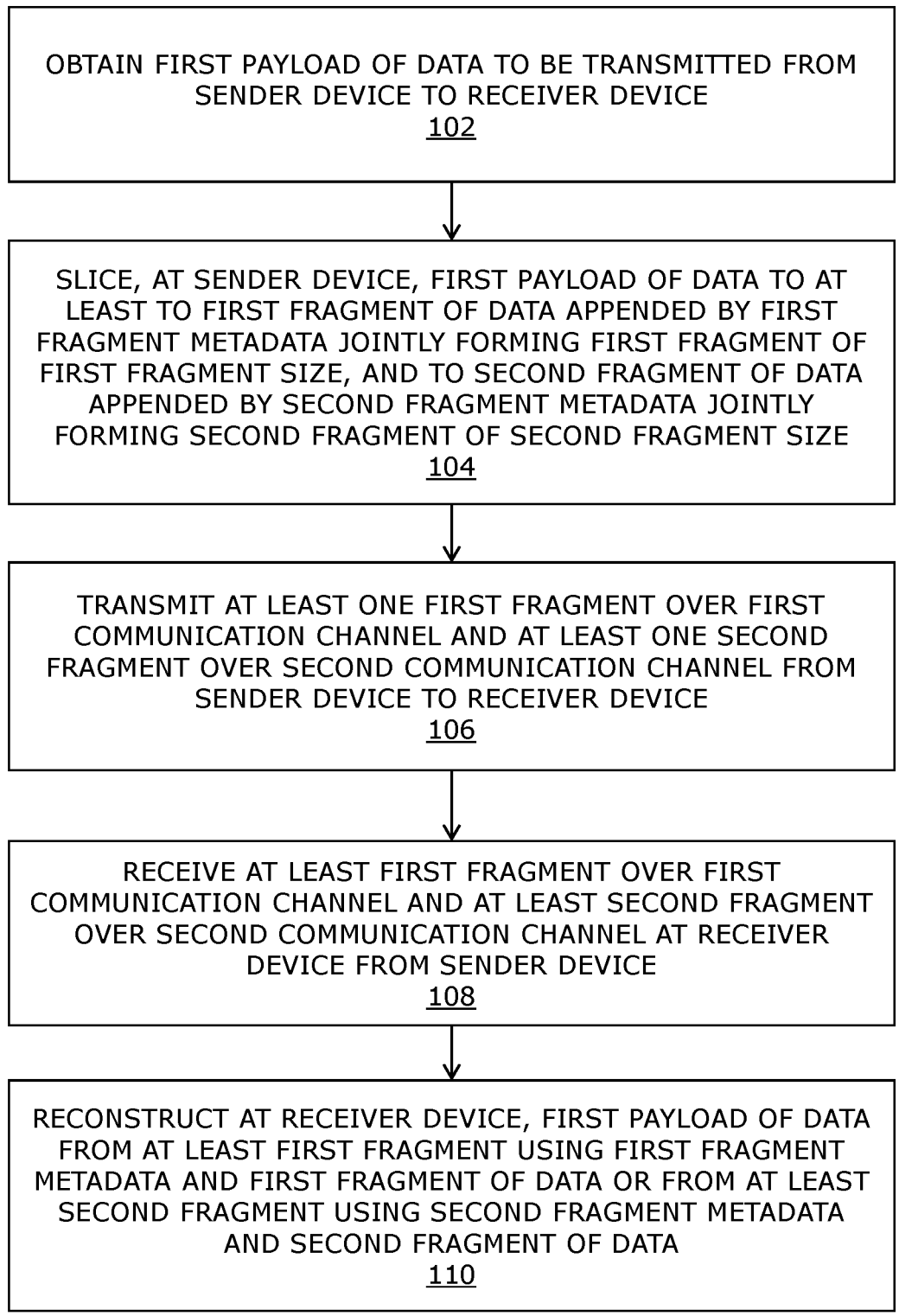
FIG. 1 illustrates steps of a method for timely transmission of a first payload of data from a sender device to a receiver device, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method for timely transmission of a first payload of data from a sender device to a receiver device, the method comprising:

—obtaining, the first payload of data to be transmitted from the sender device to the receiver device;

—slicing, at the sender device, the first payload of data to at least to a first fragment of data appended by a first fragment metadata jointly forming a first fragment of a first fragment size, and to a second fragment of data appended by a second fragment metadata jointly forming a second fragment of a second fragment size;

—transmitting, the at least first fragment over a first communication channel and the at least second fragment over a second communication channel from the sender device to the receiver device;

—receiving, the at least first fragment over the first communication channel and the at least second fragment over the second communication channel at the receiver device from the sender device; and —reconstructing, at the receiver device, the first payload of data from the at least first fragment using the first fragment metadata and the first fragment of data and from the at least second fragment using the second fragment metadata and the second fragment of data.

The present disclosure provides the aforementioned method for timely transmission of a first payload of data from a sender device to a receiver device. Herein, the slicing of the first payload of data at the sender device, and then the reconstruction of the first payload of data at the receiver device, ensures that only small sections of data of the first payload of data are transmitted at once in a given communication channel which mitigates accumulation of latency during the transmission of the first payload of data from the sender device to the receiver device over lossy communication channels. Subsequently, the mitigation of accrued latency ensures a more controllable and timely transmission of the first payload of data. Moreover, the method may be suitable to be used over secured protocols of communication such as a Transmission Control Protocol (TCP) while providing a timely transmission of the first payload of data from the sender device to the receiver device. Thus, user while receiving the first payload of data on the receiver device need not to compromise on either one of: a security, or a timelines of the transmission, as the transmission of the first payload of data in the aforementioned method is both timely as well as secure.

Throughout the present disclosure, the term "payload of data" refers to that specific portion of a data signal which actually contains an information that is to be sent by the transmission of the data signal. Optionally the first payload of data comprises one or more of: a text data, an audio data, a video data, and the like. Optionally, the sender device may send a request to the receiver device for transmitting the first payload of data to the receiver device. Alternatively, optionally, the receiver device may send the request to the sender device to receive the first payload of data from the sender device.

Notably, the transmission of the first payload of data from the sender device to the receiver using internet takes place in accordance with certain networking protocols that enables transmission of the first payload of data. It will be appreciated that, while some said networking protocols may provide faster transmission of the first payload of data, while other said networking protocols may provide a more secure transmission of the first payload of data. Optionally, the method of the present disclosure uses a TCP protocol for the transmission of the first payload of data.

Herein, the first payload of data is obtained by the sender device from a user, or a device via one of: a text input, an audio input, a video input, and the like. Moreover, the sender device and the receiver device are connected via a wired connection, or a wireless connection, or a quantum connection for transmitting the first payload of data.

Throughout the present disclosure, the term "fragment of data" refers to a section of the first payload of data that contains a certain portion of information from within an entire information that is contained in the first payload of data, where the fragment of data is formed by slicing the first payload of data. Throughout the present disclosure, the term "fragment metadata" refers to a certain data signal that contains the information regarding certain characteristics of the fragment of data. For example, the fragment metadata contains one or more of: a size of the fragment of data, a nature of the information contained in first fragment of data, and the like. Notably, by appending the first fragment metadata to the first fragment of data, the first fragment of the first fragment size is formed. Similarly, by appending the second fragment metadata to the second fragment of data, the second fragment of the second fragment size is formed. In an implementation, the first payload of data is sliced in more than two fragments of data. For example, the first payload of data may be sliced into five fragments of data, where the first fragment of the first fragment size, the second fragment of the second fragment size, a third fragment of a third fragment size, a fourth fragment of a fourth fragment size, and a fifth fragment of a fifth fragment size is formed. Fragment size can be varied, to achieve continuous adaptation when lossy communication channel characteristics change for example in terms of packet loss, to achieve the timely transmission of the first payload of data.

Optionally, the first fragment metadata comprises a first fragment of data intra-payload identifier and a first fragment delimiter, and the second fragment metadata consists of a second fragment of data intra-payload identifier and a second fragment delimiter. Thus, advantageously, the first fragment metadata and the second fragment metadata comprises a minimal required information to unambiguously reconstruct the first payload of data.

Optionally, the slicing of the first payload of data is implemented so that the first fragment of the first fragment size is kept smaller or equal in size to a fragment size limit, which is defined as a product of a fragment size unit and a fragment size scaling coefficient, and the remaining of the first payload of data, if any, is used to create at least the second fragment of the second fragment size, which is also kept smaller or equal in size to the fragment size limit, until all of the first payload of data has been sliced into fragments. In this regard, the term "fragment size limit" refers to a threshold size value that limits an amount of information of the first payload of data that can be contained in a given fragment. Notably, the fragment size limit is formed by the product of the fragment size scaling coefficient (i.e., a numerical value of the fragment size limit) and the fragment size unit (i.e., a unit used to express the fragment size limit). For example, the fragment size limit may be 5 MB, where 5 is the fragment size scaling coefficient and MB is the fragment size unit. Subsequently, each of the fragment that is formed from the first payload of data cannot exceed the fragment size limit and once the given fragment reaches the fragment size limit, a next fragment of the first payload data is formed. In this regard, the aforementioned process of slicing repeats until the first payload of data is sliced completely. Thus, beneficially, the first payload of data is not sliced in fragments of data containing large amount of data, which prevents any retransmission-induced latency from impacting the other fragments, effectively allowing mitigation and control over the negative effects of HOLB, while transmitting the first payload of data.

Optionally, the fragment size unit is selected to be equal to at least one from a group:
— at least a Byte (B),
— a Protocol Data Unit (PDU),
— a TCP Maximum Segment Size (TCP MSS),
— a product of the TCP MSS and a TCP Window (TCP W), or
— a product of the TCP MSS and TCP W and 2 to the power of TCP Window Scale (WS).

In this regard, the "PDU" refers to a basic unit through which an exchange between two entities happen that communicate via a networking protocol. Herein, the "TCP MSS" is a largest possible size of the data unit that the receiver device is able to accept in a given fragment while communicating via a networking protocol. Thus, beneficially, the method incorporates various possible sizes in which the fragment size unit can be selected, thus, making the method suitable to be used across various applications.

Optionally, the fragment size scaling coefficient, from among a plurality of fragment size scaling coefficients, is determined by selecting the input parameters for an analytical solution or by selecting the indexes of a lookup table for an empirical solution, at least as follows:
— a communication channel packet loss probability, from among a plurality of communication channel packet loss probabilities;
— the expected fragment transfer time, from among a plurality of expected fragment transfer times;
— a percentile of expected fragment transfer time, from among a plurality of percentile of expected fragment transfer times.

In this regard, an optimal size for the slicing is determined to prevent retransmissions and to maximally use channel capacity. Moreover, the communication channel packet loss probability is inherent to the communication channel (i.e., the communication channel is an independent variable). Furthermore, the expected fragment transfer time and the percentile of expected fragment transfer time are application dependent (i.e., are user defined independent variables). For example, if in a communication network with the communication channel packet loss of 0.1%, the user desires that 80% of fragments be transmitted within 100 ms, then the method, beneficially, allows to determine the optimum fragment size scaling coefficient.

Optionally, the expected fragment transfer time is expressed at least by one of: in units of a round trip time or units normalized to a multiple of round trip time. Herein, the term "round trip time" refers to a total time taken for the given fragment to reach the receiver device from the sender device, and an acknowledgement of receiving the given fragment to reach the sender device from the receiver device. Thus, beneficially, expressing the expected fragment transfer time at least by one of: in the units of the round trip time or the units normalized to the multiple of the round trip time, enables the method to ensure that a complete data of the given fragment is transmitted from the sender device to the receiver device timely in respect to a time interval of the expected fragment transfer time.

Optionally, the percentile of expected fragment transfer time is expressed by a Percentile empirically approximated or analytically derived by a Gamma distribution or a Poisson distribution. Optionally, the percentile of expected fragment transfer time can be produced through prior measurements. Alternatively, the percentile of expected fragment transfer time can also be obtained from general principles based on percentiles of the Gamma (or more specifically Poisson) distribution of the expected fragment transfer times based on the given communication channel packet loss and the given fragment size scaling coefficient.

Optionally, the first communication channel and the second communication channel are each individually selected from a group of:
—a communication channel over raw socket;
—a communication channel over TCP socket; or
—a communication channel over UDP socket.

In this regard, the term "raw socket" refers to a network socket (i.e., an endpoint in a data exchange between two devices) that allows a given device to send or receive packets of data without needing an operating system of the given device as a middleman. Thus, advantageously, selecting the first communication channel and the second communication channel from the group of communication channel over the raw socket removes the need for any middleman in the given communication channel. Herein, the term "TCP socket" refers to the network socket that enables a connection to any given remote server. Thus, advantageously, selecting the first communication and the second communication channel from the group of communication channel over the TCP socket enables to efficiently send and receive the first payload of data from a remote server. Herein, the term "UDP socket" refers to the network socket that beneficially, enables transmission of the first payload of data using the UDP protocol.

Optionally, the fragment size scaling coefficient is used for a congestion control for each individually selected from a group of:
—the communication channel over a raw socket;
—the communication channel over TCP socket; or
—the communication channel over UDP socket.

In this regard, the term "congestion control" refers to a mechanism that controls an entry of data packets of the given fragment into the given communication channel in a way that enables an efficient use of the given communication channel by preventing any collapse due to congestion in the given communication channel or across the communication channels. Herein, using the fragment size scaling coefficient for the congestion control enables the method to apply the congestion control in accordance with the size of any given fragment and thus, beneficially, mitigating accumulation of latency in the given communication channel.

Optionally, the fragment size limit, is used to determine a communication channel receive buffer size as at least one from a group of:
—a raw socket receive buffer;
—a TCP socket receive buffer; or
—a UDP socket receive buffer.

In this regard, the term "communication channel receive buffer size" refers to a buffer size limit of the receiver device's memory that can be used by the receiver device for receiving data packets of the first payload of data over a given communication channel. Herein, by determining the communication channel receive buffer size as the at least one from the group of: the raw socket receive buffer; the TCP socket receive buffer; or the UDP socket receive buffer, the receiver device, can use the receiver device's memory efficiently with any type of network socket. Thus, beneficially, the method is suitable to be used across a variety of applications.

Optionally, the communication channel receive buffer size is set as larger or equal in size than the fragment size limit and as smaller or equal in size than a bandwidth delay product divided by a number of concurrent communication channels. In this regard, setting the communication channel receive buffer size ensures that the amount of the receiver device's memory that is used as the communication channel receive buffer size is not in excess than what is required in accordance with the fragment size limit. Herein, the "bandwidth delay product" refers to an amount of data that can be transmitted from the sender device to the receiver device before an initial unit of data is considered to be received by the receiver device. Thus, beneficially, setting the communication channel receive buffer size as smaller or equal in size than the bandwidth delay product divided by the number of concurrent communication channels allows the communication channel receive buffer size to be at least equal to a minimum amount of data that can be transmitted in a single cycle of transmission over a single communication channel. Ability to use smaller receive buffer sizes may allow to achieve higher communication channel utilization rate, mitigating buffer bloat, and more efficient resource usage such as memory allocation.

Optionally, the percentile of expected fragment transfer time complement to one is used to determine a payload forward error correction coefficient that is further used to create a first payload of data error correction data based on the first payload of data, the first fragment metadata is amended with the first payload of data error correction data and the second fragment metadata is amended with the first payload of data error correction data. Herein, the term "payload forward error correction coefficient" refers to a scale at which a limited amount of missing fragments of the given payload of data can be corrected without a need for retransmission or waiting for missing fragments. In this regard, the first payload of data error correction data contains a specific data that is needed to apply forward error correction on the given fragments that correspond to the first payload of data.

Optionally, the first payload of data is associated with a first payload of data identifier that is amended to the first fragment metadata and to the second fragment metadata. In this regard, the first payload of data identifier that is amended to first fragment metadata and the second fragment metadata, beneficially, enables the receiver device to determine that the first fragment and the second fragment that are received by the receiver device are meant belong to the first payload of data and are then, subsequently, used for the reconstruction of the first payload of data.

Optionally, the first payload of data is obtained from among a plurality of payload of data, wherein the first payload of data is reconstructed by using the first payload of data identifier when the first payload of data is obtained from among the plurality of payload of data. In this regard, the sender device may obtain the plurality of payload of data simultaneously or continuously which is then used to obtain the first payload of data. For example, while broadcasting a live stream of a football match, there may be multiple cameras installed at a football ground that are simultaneously recording data, and the data recorded by each of the multiple cameras is used to obtain the first payload of data which is obtained by the sender device (such as a broadcasting station) from multiple sources. Notably, the plurality of payload of data can be obtained from the multiple sources in any random sequence or order to obtain the first payload of data. Thus, advantageously, the method efficiently transmits the first payload of data in applications that involves obtaining the first payload of data from among the plurality of payload of data. Herein, each of the payload of data from among the plurality of payload of data comprises of separate fragments of data. Notably, using the first payload of data identifier for the reconstruction of the first payload of data enables to identify out of all the separate fragments of data which are the first fragment data and the second fragment data belonging to a specific payload of data from among plurality of payload of data.

Optionally, the first payload of data, from among the plurality of payload of data, is part of a sequence of payload of data, wherein the first payload of data is reconstructed by using the first payload of data identifier when the first payload of data is part of the sequence of payload of data. In this regard, for some implementations, the method involves continuously or simultaneously transmitting the sequence of payload of data from the sender device to the receiver device. For example, while broadcasting the live stream of the football match, the sequence of the payload of data needs to be transmitted from the broadcasting station to a device of a viewer, the sequence of payload of data, which covers a live broadcast of the entire length of the football match payload by payload, needs to be transmitted. Thus, advantageously, the method efficiently transmits the first payload of data in applications that involves obtaining the first payload of data from among a sequence of payload of data. Herein, each of the payload of data that is the part of the sequence of payload of data comprises of the separate fragments of data. Notably, using the first payload of data identifier for the reconstruction of the first payload of data enables to identify out of all the separate fragments of data which are the first fragment data and the second fragment data belonging to a specific payload of data from among sequence of payload of data.

Notably, to ensure faster transmission of the first fragment and the second fragment of the first payload of data, the first fragment and the second fragment are sent separately over the first communication channel and the second communication channel respectively, from the sender device to the receiver device. Optionally, the first communication channel and the second communication channel may be selected from one of: a satellite communication, an optical fibre communication, a GSM communication, a Wi-Fi communication, a quantum communication, and the like. In an implementation, if the first payload of data is sliced into more than two fragments, then a separate communication channel is used for each of the fragment of the first payload of data.

Subsequently, once the fragments are received by the receiver device, in order to extract the entire information contained in the first payload of data, the first payload of data is reconstructed via using the fragments that are received. Notably, the first fragment metadata and the second fragment metadata contains the information that is required to reconstruct the first payload of data, such as one or more of: a size, an order, and the like, of the at least first fragment and the at least second fragment. Once, the first payload of data is reconstructed, then, accordingly the receiver device is able to retrieve the information that is contained in the first payload of data and use the information that is retrieved for any desired application.

Optionally, the first payload of data is reconstructed from the first fragment based on the first fragment metadata using the first fragment delimiter and the first fragment of data intra-payload identifier and the first fragment of data together with the second fragment based on the second fragment metadata using the second fragment delimiter and the second fragment of data intra-payload identifier and the second fragment of data. Thus, advantageously, the first fragment metadata and the second fragment metadata comprises a minimal required information to unambiguously reconstruct the first payload of data.

Optionally, the first payload of data is reconstructed from the first fragment based on the first fragment metadata using the first fragment delimiter and the first fragment of data intra-payload identifier and the first fragment of data together with the first payload of data error correction data or from the second fragment based on the second fragment metadata using the second fragment delimiter and the second fragment of data intra-payload identifier and the second fragment of data together with the first payload of data error correction data. In this regard, a limited amount of missing fragments from any of the first fragment or the second fragment are advantageously, auto rectified using the first payload of data error correction data while the first payload of data is reconstructed.

Optionally, the method further comprises maintaining the first communication channel and the second communication channel for their re-use between the sender device and receiver device for the plurality of payload of data or for the sequence of payload of data, and their corresponding fragments after a channel re-use availability time interval. In this regard, the channel re-use availability time interval refers to a time interval after which a given communication channel is available for re-use to timely transmission of any following payload of data. Thus, advantageously, the method need not to establish the first communication channel and the second communication channel again and again between the sender device and the receiver device while transmitting more than one payload of data.

Optionally, the channel re-use availability time interval, from among a plurality of channel re-use availability time intervals, is determined by selecting the input parameters for an analytical solution or by selecting the indexes of a lookup table for an empirical solution, as follows:
—the communication channel packet loss probability, from among the plurality of communication channel packet loss probabilities;
—the fragment size scaling coefficient, from among the plurality of fragment size scaling coefficients;
—a percentile of expected fragment transfer time, from among a plurality of percentile of expected fragment transfer times.

In this regard, based on the given communication channel packet loss probability, and the given fragment size scaling coefficient and the given percentile of expected transfer time, the communication channel re-use probability time can be defined. For example, in said communication channel with 0.1% of the communication channel packet loss probability with the fragment size scaling coefficient of 5, in 80% of cases the communication channel will be free for re-use after a certain number of milliseconds. Thus, advantageously, more effective communication channel re-use helps to save system and network resources.

DETAILED DESCRIPTION OF THE DRAWINGS

Referring to FIG. 1, illustrated are steps of a method for timely transmission of a first payload of data from a sender device to a receiver device, in accordance with an embodiment of the present disclosure. At step 102, the first payload of data to be transmitted from the sender device to the receiver device, is obtained. At step 104, at the sender device, the first payload of data is sliced to at least to a first fragment of data appended by a first fragment metadata jointly forming a first fragment of a first fragment size, and to a second fragment of data appended by a second fragment metadata jointly forming a second fragment of a second fragment size. At step 106, the at least first fragment is transmitted over a first communication channel and the at least second fragment is transmitted over a second communication channel from the sender device to the receiver device. At step 108, the at least first fragment is received over the first communication channel and the at least second fragment is received over the second communication channel at the receiver device from the sender device. At step 110, the first payload of data is reconstructed from the at least first fragment using the first fragment metadata and the first fragment of data or from at least the second fragment using the second fragment metadata and the second fragment of data.

The aforementioned steps 102, 104, 106, 108, and 110 are only illustrative and other alternatives can also be provided where one or more steps are added, one or more steps are removed, or one or more steps are provided in a different sequence without departing from the scope of the claims herein.

Figure 2:
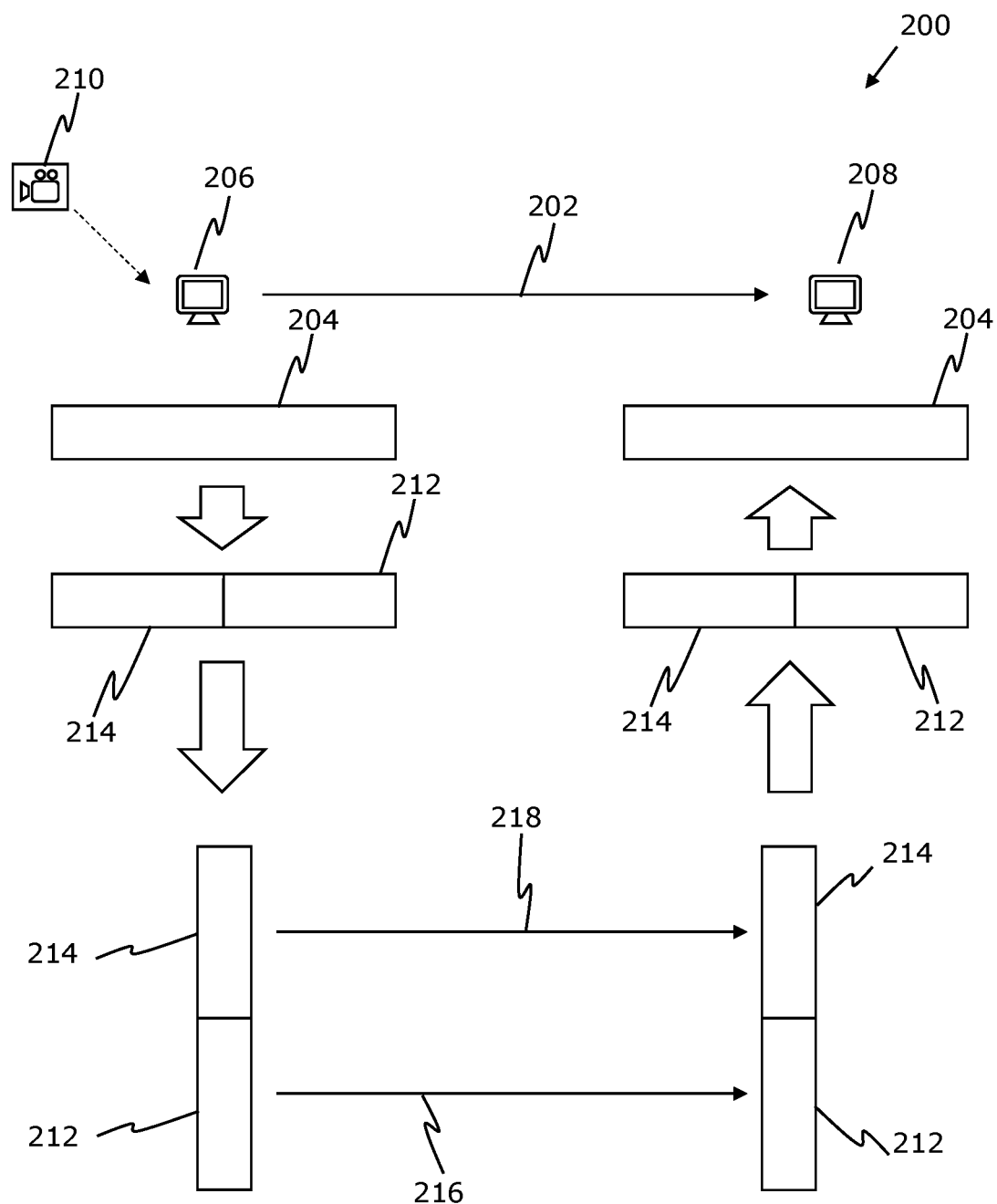
FIG. 2 illustrates an environment in which a method for timely transmission of a first payload of data from a sender device to a receiver device is used, in accordance with an embodiment of the present disclosure.

Referring to FIG. 2, illustrated is an environment 200 in which a method for timely transmission 202 of a first payload of data 204 from a sender device 206 to a receiver device 208 is used, in accordance with an embodiment of the present disclosure. Herein, the sender device 206 obtains the first payload of data 204 from a device 210. Moreover, at the sender device 206, the first payload of data 204 is sliced to form a first fragment 212 and a second fragment 214. Furthermore, the first fragment 212 is transmitted over a first communication channel 216, and the second fragment 214 is transmitted over a second communication channel 218, respectively from the sender device 206 to the receiver device 208. Furthermore, the receiver device 208 receives the first fragment 212 over the first communication channel 216, and the second fragment 214 over the second communication channel 218, respectively. Furthermore, at the receiver device 208, the first payload of data 204 is reconstructed using the first fragment 212, and the second fragment 214.

Figure 3A:
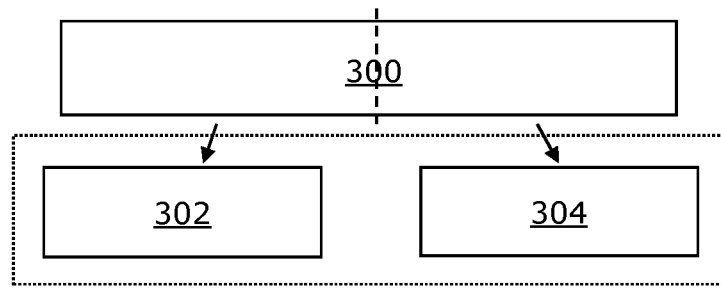
FIG. 3A illustrates a block diagram for depicting a slicing of a first payload of data, in accordance with an embodiment of the present disclosure.

Referring to FIG. 3A, illustrated is a block diagram for depicting a slicing of a first payload of data 300, in accordance with an embodiment of the present disclosure. As shown in FIG. 3A, the first payload of data 300 is sliced into a first fragment of data 302 and a second fragment of data 304.

Figure 3B:
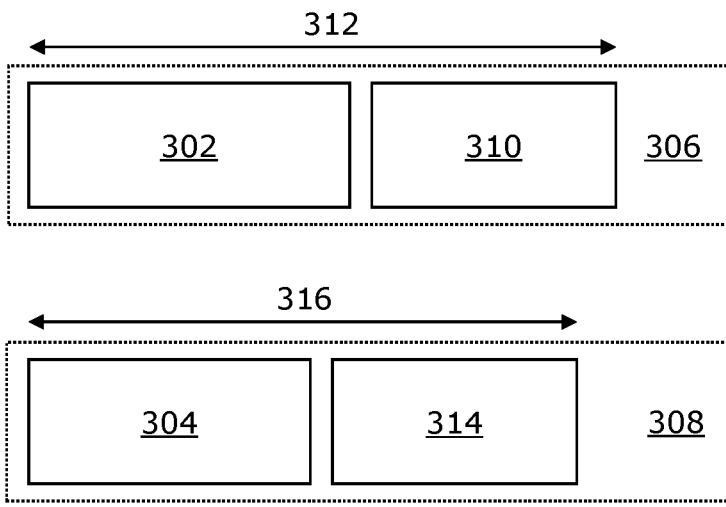
FIG. 3B illustrates a block diagram of a first fragment and a second fragment, in accordance with an embodiment of the present disclosure.

Referring to FIG. 3B, illustrated is a block diagram of a first fragment 306 and a second fragment 308, in accordance with an embodiment of the present disclosure. As shown in FIG. 3B, the first fragment 306 comprises the first fragment of data 302 appended to a first fragment metadata 310, wherein, the first fragment 306 is of a first fragment size 312. Moreover, the second fragment 308 comprises the second fragment of data 304 appended to a second fragment metadata 314, wherein, the first fragment 308 is of a first fragment size 316.

Figure 4:
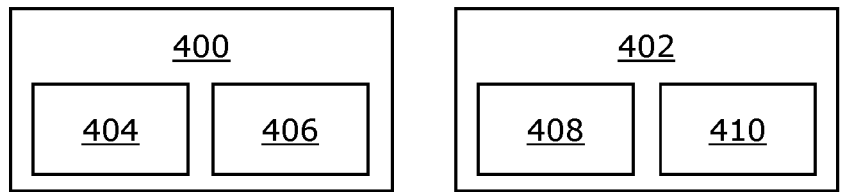
FIG. 4 illustrates a block diagram of a first fragment metadata and a second fragment metadata, in accordance with an embodiment of the present disclosure.

Referring to FIG. 4, illustrated is a block diagram of a first fragment metadata 400 and a second fragment metadata 402, in accordance with an embodiment of the present disclosure. As shown in FIG. 4, the first fragment metadata 400 comprises a first fragment delimiter 404 and a first fragment of data intra-payload identifier 406. Moreover, the second fragment metadata 402 comprises a second fragment delimiter 408 and a second fragment of data intra-payload identifier 410.

Figure 5:
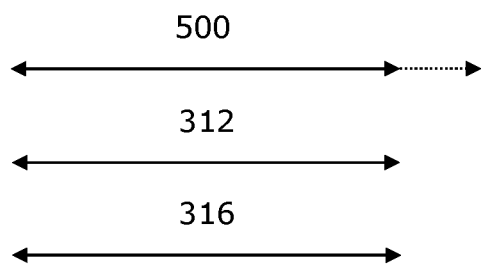
FIG. 5 illustrates a relationship of a fragment size limit with a first fragment size and a second fragment size, in accordance with an embodiment of the present disclosure.

Referring to FIG. 5, illustrated is a relationship of a fragment size limit 500 with a first fragment size (such as the first fragment size 312) and a second fragment size (such as the second fragment size 316), in accordance with an embodiment of the present disclosure. As shown in FIG. 5, the first fragment size 312 and the second fragment size 316, respectively, are equal to or smaller than the fragment size limit 500.

Figure 6:
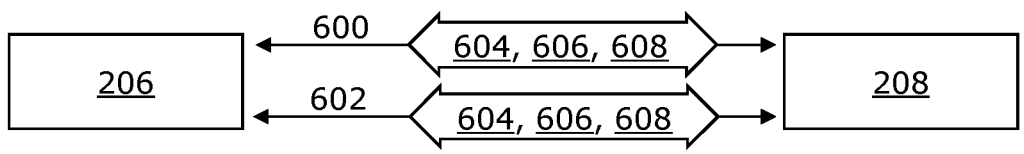
FIG. 6 illustrates a block diagram for depicting a first communication channel and a second communication channel between a sender device and a receiver device, in accordance with an embodiment of the present disclosure.

Referring to FIG. 6, illustrated is a block diagram for depicting a first communication channel 600 and a second communication channel 602 between a sender device (such as the sender device 206) and a receiver device (such as the receiver device 208), in accordance with an embodiment of the present disclosure. As shown in FIG. 6, the first communication channel 600 is established between the sender device 206 and the receiver device 208 to transmit at least first fragment, and the second communication channel 602 is established between the sender device 206 and the receiver device 208 to transmit at least second fragment. Herein, the first communication channel 600 and the second communication channel 602 are each individually selected from a communication channel over raw socket 604, a communication channel over TCP socket 606, or a communication channel over UDP socket 608.

Figure 7:
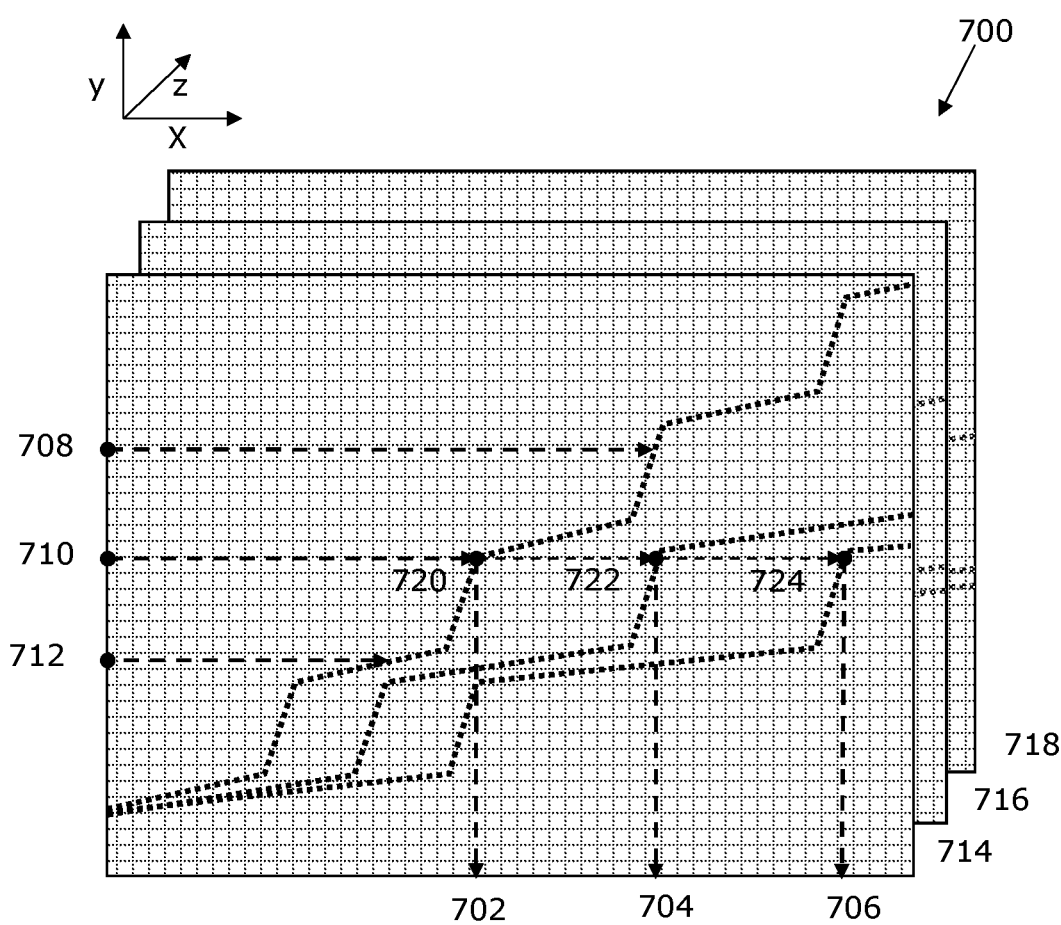
FIG. 7 illustrates a graphical representation of an analytically, or alternatively empirically, derived solution for determining a fragment size scaling coefficient from among a plurality of fragment size scaling coefficients, in accordance with an embodiment of the present disclosure.

Referring to FIG. 7, illustrated is a graphical representation 700 of an analytical, or alternatively empirical, solution for determining a fragment size scaling coefficient from among a plurality of fragment size scaling coefficients, in accordance with an embodiment of the present disclosure. As shown in FIG. 7, x-axis represents the plurality of fragment size scaling coefficients (depicted as a first fragment size scaling coefficient 702, a second fragment size scaling coefficient 704, a third fragment size scaling coefficient 706). Moreover, y-axis represents a plurality of expected fragment transfer times (depicted as a first expected fragment transfer time 708, a second expected fragment transfer time 710, and a third expected fragment transfer time 712). Furthermore, z-axis represents a plurality of communication channel packet loss probabilities (depicted as a first communication channel packet loss probability 714, a second communication channel packet loss probability 716, and a third communication channel packet loss probability 718). Herein, from among plurality of percentile of expected fragment transfer times, a first percentile of expected fragment transfer time 720, a second percentile of expected fragment transfer time 722, and a third percentile of expected fragment transfer time 724 are plotted in the graphical representation 700.

Figure 8:
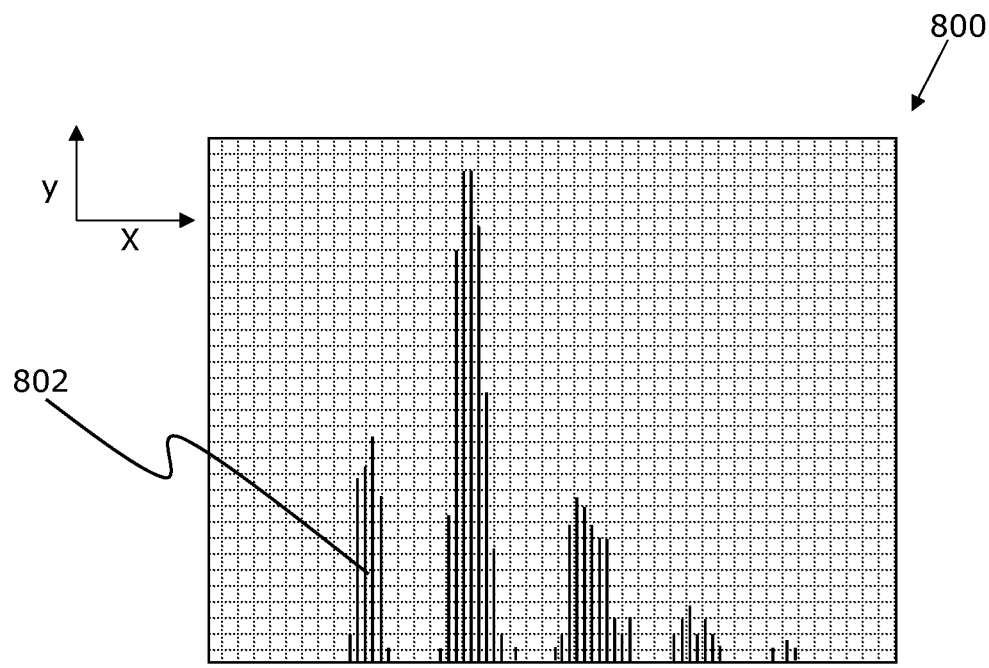
FIG. 8 illustrates a graphical representation of a percentile of expected fragment transfer time, in accordance with an embodiment of the present disclosure.

Referring to FIG. 8, illustrated is a graphical representation 800 of a percentile of expected fragment transfer time 802, from among plurality of percentile of expected fragment transfer times, in accordance with an embodiment of the present disclosure. As shown in FIG. 8, x-axis represents an expected fragment transfer time, and y-axis represents a fragment count.

Figure 9:
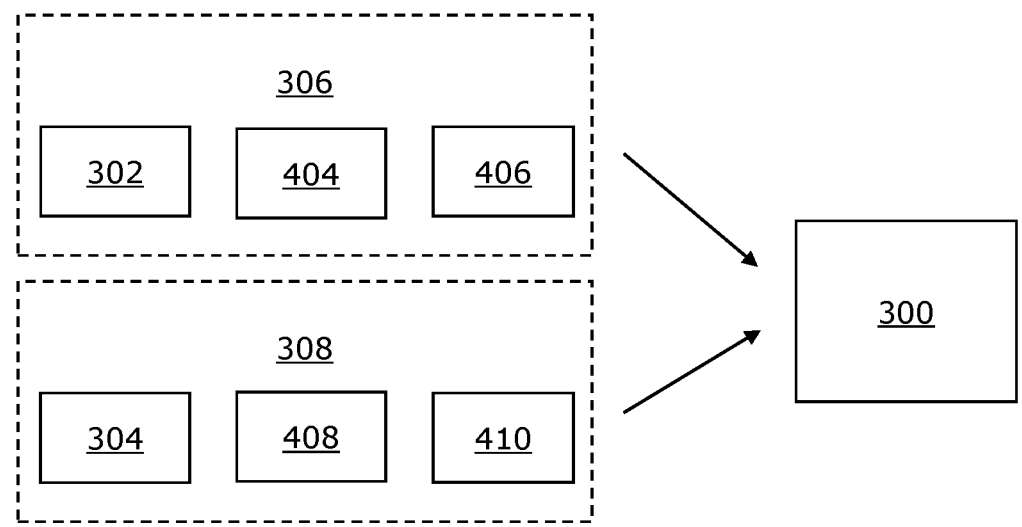
FIG. 9 illustrates a block diagram for a reconstruction of a first payload of data, in accordance with an embodiment of the present disclosure.

Referring to FIG. 9, illustrated is a block diagram for a reconstruction of a first payload of data (such as the first payload of data 300 of FIG. 3A), in accordance with an embodiment of the present disclosure. As shown in FIG. 9, the first payload of data 300 is reconstructed from the first fragment 306 using the first fragment delimiter 404 and the first fragment of data intra-payload identifier 406 and the first fragment of data 302 together with the second fragment 308 using the second fragment delimiter 408 and the second fragment of data intra-payload identifier 410 and the second fragment of data 304.

Figure 10:
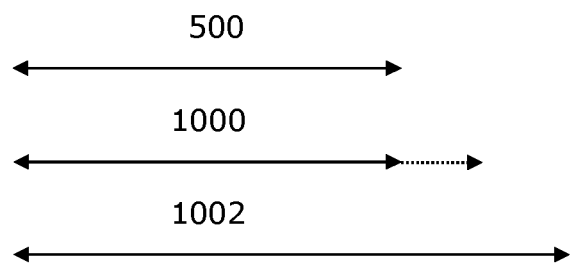
FIG. 10 illustrates a relationship of a communication channel receive buffer size with the fragment size limit and a quotient of a bandwidth delay product and a number of concurrent communication channels, in accordance with an embodiment of the present disclosure.

Referring to FIG. 10, illustrated is a relationship of a communication channel receive buffer size 1000 with a fragment size limit (such as the fragment size limit 500) and a quotient 1002 of a bandwidth delay product and a number of concurrent channels, in accordance with an embodiment of the present disclosure. As shown in FIG. 10, the communication channel receive buffer size 1000 is larger than or equal to the fragment size limit 500, and the communication channel receive buffer size 1000 is smaller than or equal to the quotient 1002 of the bandwidth delay product and the number of concurrent channels.

Figure 11:
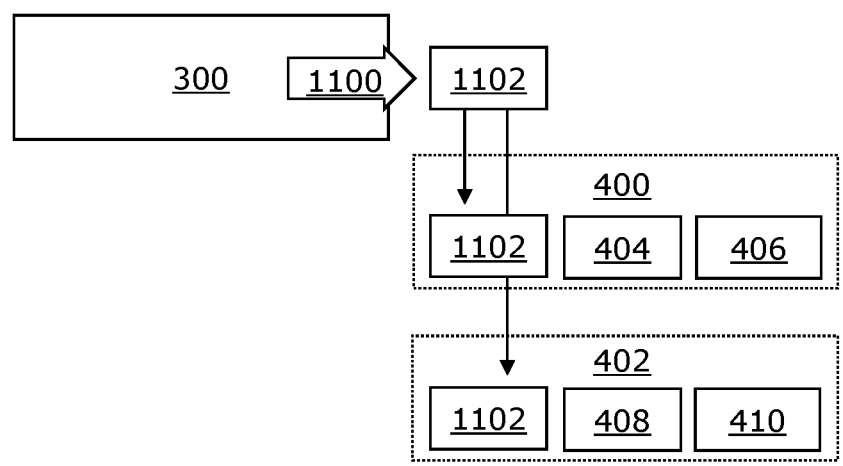
FIG. 11 illustrates a block diagram of creation of a first payload of data error correction data based on a first payload of data, in accordance with an embodiment of the present disclosure.

Referring to FIG. 11, illustrated is a block diagram of use of a forward error correction in a first payload of data (such as the first payload of data 300 of FIG. 3A), in accordance with an embodiment of the present disclosure. As shown in FIG. 11, a payload forward error correction coefficient 1100 is used to create a first payload of data error correction data 1102 based on the first payload of data 300. Herein, the first fragment metadata 400 is amended with the first payload of data error correction data 1102, and the second fragment metadata 402 is amended with the first payload of data error correction data 1102.

Figure 12:
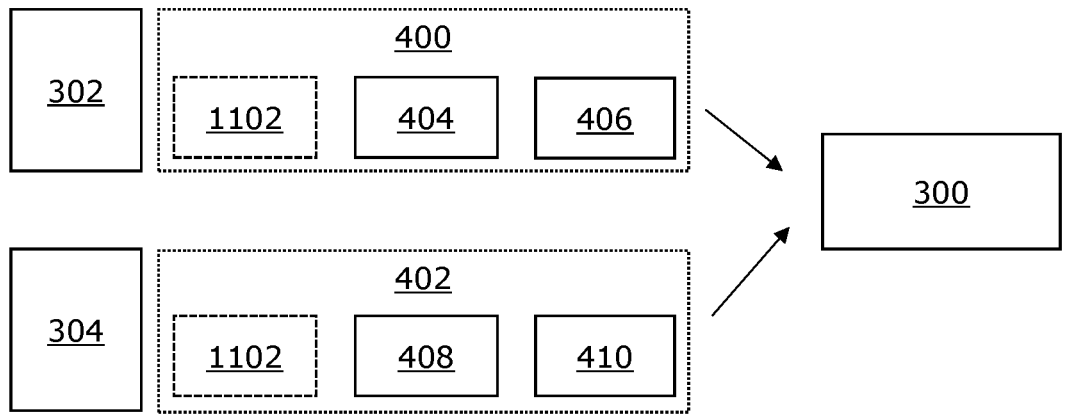
FIG. 12 illustrates a block diagram for reconstruction of the first payload of data using a first payload of data error correction data, in accordance with an embodiment of the present disclosure.

Referring to FIG. 12, illustrated is a block diagram for reconstruction of a first payload of data (such as the first payload of data 300) using the first payload of data error correction data 1102, in accordance with an embodiment of the present disclosure. As shown in FIG. 12, the first payload of data 300 is reconstructed from the first fragment 306 based on the first fragment metadata 400 using the first fragment delimiter 404 and the first fragment of data intra-payload identifier 406 and the first fragment of data 302 together with the first payload of data error correction data 1102, or from the second fragment 304 based on the second fragment metadata 402 using the second fragment delimiter 408 and the second fragment of data payload identifier 410 and the second fragment of data 304 together with the first payload of data error correction data 1102.

Figure 13:
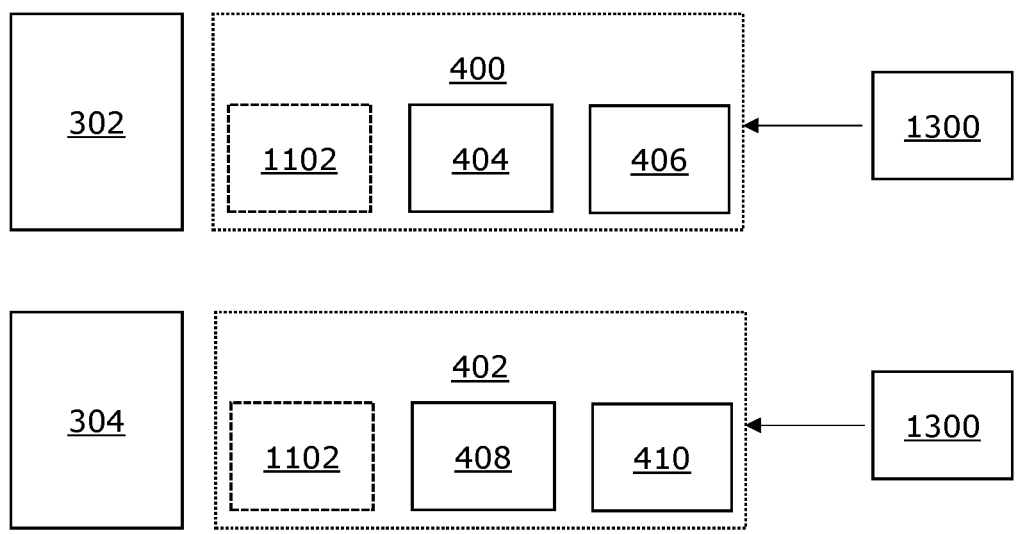
FIG. 13 illustrates a block diagram for depicting an addition of a first payload of data identifier, in accordance with an embodiment of the present disclosure.

Referring to FIG. 13, illustrated is a block diagram for depicting an addition of a first payload of data identifier 1300, in accordance with an embodiment of the present disclosure. As shown in the FIG. 13, the first payload of data identifier 1300 is added to the first fragment metadata 400. Likewise, the first payload of data identifier 1300 is added to the second fragment metadata 402.

Figure 14:
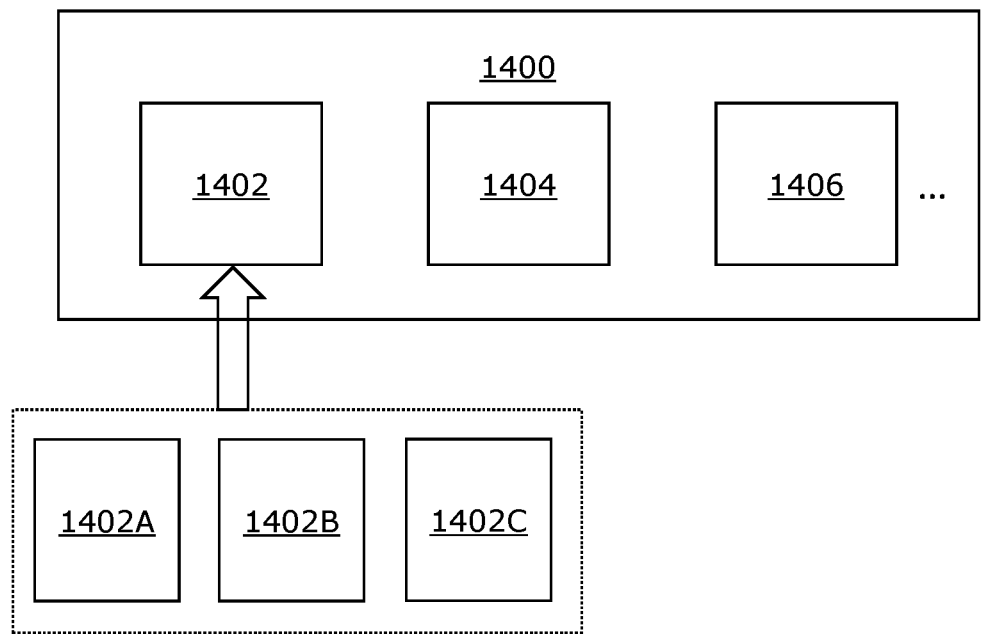
FIG. 14 illustrates a block diagram for depicting a plurality as well as a sequence of payload of data, in accordance with an embodiment of the present disclosure.

Referring to FIG. 14, illustrated is a block diagram for depicting a sequence 1400 of payload of data, in accordance with an embodiment of the present disclosure. As shown in FIG. 13, the sequence of payload of data comprises a first payload of data 1402, a second payload of data 1404, and a third payload of data 1406. Herein, the first payload of data 1402 is obtained from plurality of payload of data (depicted as payloads of data 1402A, 1402B, and 1402C, respectively). The plurality of payload of data can be collectively referenced as 1402A-C. Similarly, the second payload of data 1404 and third payload of data 1406 can be obtained from their corresponding pluralities of payloads of data.

Figure 15:
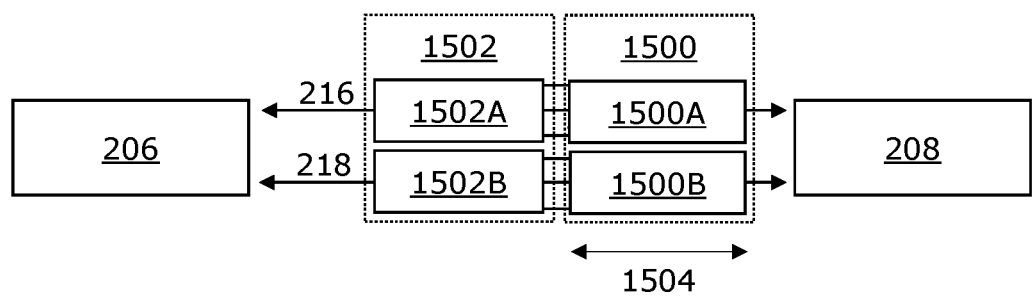
FIG. 15 illustrates a block diagram for re-use of the first communication channel and the second communication channel, in accordance with an embodiment of the present disclosure.

Referring to FIG. 15, illustrated is a block diagram for re-use of the first communication channel 216 and the second communication channel 218, in accordance with an embodiment of the present disclosure. As shown in FIG. 15, a first fragment 1500A and a second fragment 1500B of a first payload of data 1500, respectively, are transmitted over the first communication channel 216 and the second communication channel 218 from the sender device 206 to the receiver device 208. Moreover, a first fragment 1502A and a second fragment 1502B of a second payload of data 1502, are respectively, transmitted over the first communication channel 216 and the second communication channel 218 from the sender device 206 to the receiver device 208. Optionally, the first payload of data 1500 and the second payload of data 1502, are parts of a plurality of payload of data, or a sequence of payload of data. Moreover, the first communication channel 216 and the second communication channel 218 are re-used for the transmission of the second payload of data 1502, after the first payload of data 1500 is transmitted from the sender device 206 to the receiver device 208. Notably, the first communication channel 216 and the second communication channel 218 are available for re-use after a channel re-use availability time interval 1504.

Figure 16:
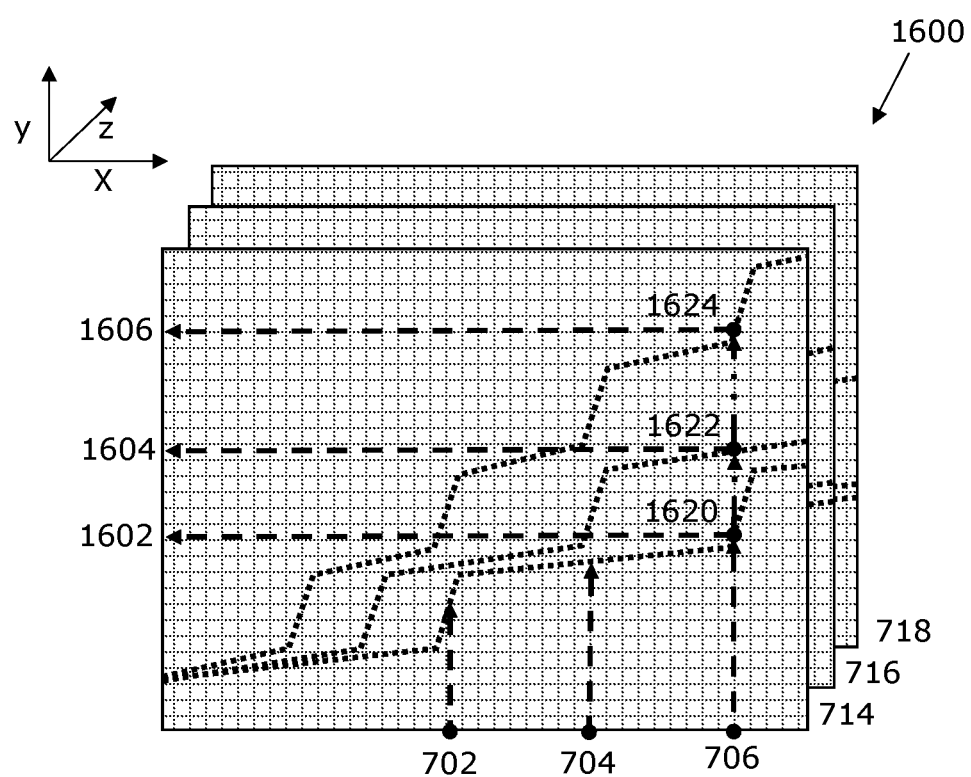
FIG. 16 illustrates a graphical representation of an analytically, or alternatively empirically, derived solution for determining a channel re-use availability time interval, from among a plurality of channel re-use availability time interval, in accordance with an embodiment of the present disclosure.

Referring to FIG. 16, illustrates a graphical representation 1600 of an analytical solution for determining a channel re-use availability time interval, from among a plurality of channel re-use availability time intervals, in accordance with an embodiment of the present disclosure. As shown in FIG. 15, x-axis represents the plurality of fragment size scaling coefficients (depicted as a first fragment size scaling coefficient 702, a second fragment size scaling coefficient 704, a third fragment size scaling coefficient 706). Moreover, y-axis represents the plurality of channel re-use availability time intervals (depicted as a first channel re-use availability time interval 1602, a second channel re-use availability time interval 1604, and a third channel re-use availability time interval 1606). Furthermore, z-axis represents a plurality of communication channel packet loss probabilities (depicted as a first communication channel packet loss probability 714, a second communication channel packet loss probability 716, and a third communication channel packet loss probability 718). Herein, from among plurality of percentile of expected fragment transfer times, a first percentile of expected fragment transfer time 1620, a second percentile of expected fragment transfer time 1622, and a third percentile of expected fragment transfer time 1624 are plotted in the graphical representation 1600.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for timely transmission of a first payload of data from a sender device to a receiver device, the method comprising:
   obtaining, the first payload of data to be transmitted from the sender device to the receiver device;
   slicing, at the sender device, the first payload of data to at least to a first fragment of data appended by a first fragment metadata jointly forming a first fragment of a first fragment size, and to a second fragment of data appended by a second fragment metadata jointly forming a second fragment of a second fragment size;

transmitting, the at least first fragment over a first communication channel and the at least second fragment over a second communication channel from the sender device to the receiver device;

receiving, the at least first fragment over the first communication channel and the at least second fragment over the second communication channel at the receiver device from the sender device; and reconstructing, at the receiver device, the first payload of data from the at least first fragment using the first fragment metadata and the first fragment of data or from the at least second fragment using the second fragment metadata and the second fragment of data.

2. The method according to claim 1, wherein the first fragment metadata comprises a first fragment of data intra-payload identifier and a first fragment delimiter, and the second fragment metadata consists of a second fragment of data intra-payload identifier and a second fragment delimiter.

3. The method according to claim 1, wherein the slicing of the first payload of data is implemented so that the first fragment of the first fragment size is kept smaller or equal in size to a fragment size limit, which is defined as a product of a fragment size unit and a fragment size scaling coefficient, and the remaining of the first payload of data, if any, is used to create at least the second fragment of the second fragment size, which is also kept smaller or equal in size to the fragment size limit, until all of the first payload of data has been sliced into fragments.

4. The method according to claim 3, wherein the fragment size unit is selected to be equal to at least one from a group:
at least a Byte (B);
a Protocol Data Unit (PDU);
a TCP Maximum Segment Size (TCP MSS);
a product of the TCP MSS and a TCP Window (TCP W); or
a product of the TCP MSS and TCP W and 2 to the power of TCP Window Scale (WS).

5. The method according to claim 3, wherein the fragment size scaling coefficient, from among a plurality of fragment size scaling coefficients, is determined by selecting the input parameters for an analytical solution or by selecting the indexes of a lookup table for an empirical solution, at least as follows:
a communication channel packet loss probability, from among a plurality of communication channel packet loss probabilities;
the expected fragment transfer time, from among a plurality of expected fragment transfer times;
a percentile of expected fragment transfer time, from among a plurality of percentile of expected fragment transfer times.

6. The method according to claim 5, wherein the percentile of expected fragment transfer time is expressed by a Percentile empirically approximated or analytically derived by a Gamma distribution or a Poisson distribution.

7. The method according to claim 1, wherein the first communication channel and the second communication channel are each individually selected from a group of:
a communication channel over raw socket;
a communication channel over TCP socket; or
a communication channel over UDP socket.

8. The method according to claim 1, wherein the first payload of data is reconstructed from the first fragment based on the first fragment metadata using the first fragment delimiter and the first fragment of data intra-payload identifier and the first fragment of data together with the second fragment based on the second fragment metadata using the second fragment delimiter and the second fragment of data intra-payload identifier and the second fragment of data.

9. The method according to claim 1, wherein the fragment size limit, is used to determine a communication channel receive buffer size as at least one from a group of:
a raw socket receive buffer;
a TCP socket receive buffer; or
a UDP socket receive buffer.

10. The method according to claim 9, wherein the communication channel receive buffer size is set as larger or equal in size than the fragment size limit and as smaller or equal in size than a bandwidth delay product divided by a number of concurrent communication channels.

11. The method according to claim 1, wherein the percentile of expected fragment transfer time complement to one is used to determine a payload forward error correction coefficient that is further used to create a first payload of data error correction data based on the first payload of data, the first fragment metadata is amended with the first payload of data error correction data and the second fragment metadata is amended with the first payload of data error correction data.

12. The method according to claim 11, wherein the first payload of data is reconstructed from the first fragment based on the first fragment metadata using the first fragment delimiter and the first fragment of data intra-payload identifier and the first fragment of data together with the first payload of data error correction data or from the second fragment based on the second fragment metadata using the second fragment delimiter and the second fragment of data payload identifier and the second fragment of data together with the first payload of data error correction data.

13. The method according to claim 1, wherein the first payload of data is associated with a first payload of data identifier that is amended to the first fragment metadata and to the second fragment metadata.

14. The method according to claim 13, wherein the first payload of data is obtained from among a plurality of payload of data, wherein the first payload of data is reconstructed by using the first payload of data identifier when the first payload of data is obtained from among the plurality of payload of data.

15. The method according to claim 14, wherein the first payload of data, from among the plurality of payload of data, is part of a sequence of payload of data, wherein the first payload of data is reconstructed by using the first payload of data identifier when the first payload of data (1400) is part of the sequence of payload of data.

16. The method according to claim 14, wherein the method further comprises maintaining the first communication channel and the second communication channel for their re-use between the sender device and receiver device for the plurality of payload of data or for the sequence of payload of data, and their corresponding fragments after a channel re-use availability time interval.

17. The method according to claim 16, wherein the channel re-use availability time interval, from among a plurality of channel re-use availability time intervals, is determined by selecting the input parameters for an analytical solution or by selecting the indexes of a lookup table for an empirical solution, as follows:
the communication channel packet loss probability, from among the plurality of communication channel packet loss probabilities;

the fragment size scaling coefficient, from among the plurality of fragment size scaling coefficients;
a percentile of expected fragment transfer time, from among a plurality of percentile of expected fragment transfer times.

18. The method according to claim 1, wherein the expected fragment transfer time is expressed at least by one of: in units of a round trip time or units normalized to a multiple of round trip time.

19. The method according to claim 1, wherein the fragment size scaling coefficient is used for a congestion control for each individually selected from a group of:
the communication channel over a raw socket;
the communication channel over TCP socket; or
the communication channel over UDP socket.

* * * * *